United States Patent [19]
Luckenbill

[11] 3,815,940
[45] June 11, 1974

[54] JOINT FOR SMOOTH END OR FLARELESS PIPE

[75] Inventor: Lawrence F. Luckenbill, Decatur, Ill.

[73] Assignee: Mueller Co., Decatur, Ill.

[22] Filed: May 1, 1972

[21] Appl. No.: 249,095

Related U.S. Application Data

[63] Continuation-in-part of Ser. No. 165,292, July 22, 1971, abandoned.

[52] U.S. Cl............... 285/105, 285/113, 285/323, 285/342, 285/423
[51] Int. Cl............................................ F16l 17/00
[58] Field of Search ........... 285/104, 105, 113, 342, 285/348, 350, 323, 321, 423; 287/114; 24/126 C, 136 B, 263 DT; 151/14 R

[56] References Cited
UNITED STATES PATENTS

| | | | |
|---|---|---|---|
| 2,017,994 | 10/1935 | Spang................................ | 285/105 |
| 2,111,956 | 3/1938 | Baldwin............................. | 285/105 |
| 2,389,233 | 11/1945 | Cowles.............................. | 285/116 |
| 2,451,354 | 10/1948 | Ohls.................................. | 285/105 |
| 2,452,278 | 10/1948 | Woodling..................... | 285/382.7 X |
| 2,613,086 | 10/1952 | Wolfram........................ | 285/348 X |
| 2,836,446 | 5/1958 | Hall .................................. | 287/114 |
| 3,266,823 | 8/1966 | Word et al........................ | 285/144 |
| 3,349,455 | 10/1967 | Doherty......................... | 24/263 DT |
| 3,600,010 | 8/1971 | Downs............................ | 285/113 X |

FOREIGN PATENTS OR APPLICATIONS

| | | | |
|---|---|---|---|
| 932,001 | 7/1963 | Great Britain..................... | 285/321 |
| 654,021 | 12/1962 | Canada............................. | 285/113 |
| 1,151,990 | 7/1963 | Germany.......................... | 285/110 |

*Primary Examiner*—Dave W. Arola
*Attorney, Agent, or Firm*—Cushman, Darby & Cushman

[57] ABSTRACT

A joint for connecting a smooth wall pipe or tube to fittings or other pipes, the joint including a hollow body member having a passageway therethrough, a split gripper ring positioned and moveable axially within the passageway, and an annular sealing ring member also positioned and moveable axially within the passageway and functioning substantially independently of the gripper ring to provide a seal for a range of pressures within the pipe from zero pressure upwardly to and above pressures of intended use. The internal configuration of teeth of the gripper ring and the external configuration of the gripper ring cooperating with the internal configuration of the passageway in the body member is such that the pipe can be installed by a stab or thrust of the same into the body member against a stop but when the pipe is pulled in a direction outwardly of the body member, the gripper ring is actuated to grip the pipe to prevent complete removal. The annular sealing ring member functions immediately upon insertion of the pipe into the body member to provide a seal between the pipe and the body member.

19 Claims, 9 Drawing Figures

JOINT FOR SMOOTH END OR FLARELESS PIPE

This application is a continuation-in-part of my copending U. S. application Ser. No. 165,292 filed July 22, 1971, and now abandoned.

The present invention relates to an improvement in joints for flareless or smooth wall pipes, the joint being of the "stab" type. While the joint of the present invention is primarily intended for plastic pipe such as polyethylene (PE), polyvinyl chloride (PVC), polybutylene (PB), and the like, it may also be used with flareless or smooth wall metal pipe such as copper.

BACKGROUND OF THE INVENTION

For many years efforts have been made to provide a fully satisfactory joint of the "stab" type for flareless or smooth end pipe. While there has been some degree of success in the design of these joints for metallic pipe as the metal pipe is more or less stable when inserted into a joint, the advent of use of non-metallic plastic pipe has created problems in joint design not heretofore encountered with the prior art joints for metal pipe. Public utility companies for the distribution of gas and water, as well as chemical plants and the like, are now extensively using plastic pipes in their distribution systems. Such use of plastic pipes is desired because of the cost and labor savings as well as the ease of installation and elimination of corrosion problems.

While the use of plastic pipes has become more dominant in recent years, a fully satisfactory joint which can be used for both plastic and metal pipes is still desirable. In the past, "stab" type joints have been used for metal pipes and efforts have been made to use the same for plastic pipes but such prior joints had difficulty in maintaining a seal for pressure from zero throughout a range of intended use. It is highly desirable for the joint to be capable of sealing at zero line pressure because these joints are oftentimes buried in the ground and when the internal pressure of the joint is zero p.s.i., there was leakage of fluid from the exterior, for example, water table pressure, to the interior of the joint. Additionally, such prior art joints, when used with plastic pipes or for that matter thin wall metal pipes, caused the pipes to be collapsed if the joint was not properly made up. The skill of the workmen thus determined the characteristic of the made up joint. Another disadvantage of the prior art joints occurred when there was slight shifting of the pipe after make up of the joint due to loads imposed thereon by movement of the earth in which the pipe was buried caused by freezing and thawing of the ground. Such slight shifting of the pipe caused movement of the sealing member within the joint and if this sealing member had taken a permanent set on a surface of the body member of the joint which was not substantially parallel to the surface of the pipe, then leakage would occur. In other words, the prior art joints did not provide for axial movement of the sealing member between parallel surfaces but depended primarily on a wedging action between non-parallel surfaces which was only satisfactory so long as a high interior pressure was provided in the joint and there was no shifting of the pipe to cause movement of the sealing member in a non-wedging direction.

Many "stab" type joints for flareless or smooth end pipe have utilized a split gripping ring within a housing and capable of being contracted when moved relative to the housing, the split gripping ring functioning to prevent withdrawal of the pipe. The prior art split rings have not proved generally satisfactory because their effectiveness varied with regard to pullout strength of a completed joint from one fitting to another of the same type. In other words, joints using a particular type of split gripping ring sometimes gave proper performance with respect to pullout strength whereas in other instances the performance was completely unsatisfactory. There was no uniformity in performance and, of course, water and gas distribution companies would not adopt such joints for their distribution systems since this nonuniformity of result existed.

PRIOR ART

Prior art relating to joints or couplings for flareless or smooth end pipes are as follows:

| NUMBER | NAME | DATE |
| --- | --- | --- |
| Dutch 277,956 | Hawle | Nov. 10, 1964 |
| 1,508,026 | Noble | Sept. 9, 1924 |
| 2,259,453 | Beyer et al | Oct. 21, 1941 |
| 2,451,354 | Ohls | Oct. 12, 1948 |
| 2,635,901 | Osborn | Apr. 21, 1953 |
| 2,786,697 | Rescheneder | Mar. 26, 1957 |
| 3,600,010 | Downs | Aug. 17, 1971 |

BRIEF SUMMARY OF THE INVENTION

The present invention relates to an improved joint for attaching the end portion of a smooth wall or flareless pipe to a fitting or another pipe, the joint utilizing a hollow body member having a passageway therethrough, an axially extending end portion of the passageway being arranged to receive the end portion of the pipe. The internal configuration of the axially extending end portion of the passageway in such that an annular shoulder or stop is provided at the inner end thereof to limit the inward movement of the pipe during assembly. The end portion further has a first cylindrical bore of a diameter substantially equal to the diameter of the pipe, the first bore having its outer end portion spaced from the shoulder or stop to provide support of the end of the pipe when the pipe is moved away from the shoulder during make-up of the joint. A second cylindrical bore extends outwardly from the first bore and has a diameter greater than the diameter of the first bore and a frusto-conical surface extends from the second pipe bore and converges toward and terminates at the end of the end portion of the passageway. An annular sealing ring member is provided within the end portion of the passageway of the hollow body member for cooperation with the second cylindrical bore. The sealing ring member which is made of an elastomeric material, has an inner diameter less than the outer diameter of the pipe so that it is stretched when the pipe is inserted therethrough, the ring member's radial thickness being sufficient to cause it to seal against the cylindrical wall of the second bore when it is so stretched.

A spring-like flexible annular split gripper ring is positioned within the end portion of the passageway outwardly of the sealing ring, the gripper ring having a frusto-conical exterior surface generally complementary to the frusto-conical surface of the passageway and an axial extent less than the axial extent of the frusto-conical surface of the passageway. The gripper sealing ring is provided on its interior surface with gripping means and when in the relaxed position, its interior diameter is less than the outside diameter of the pipe so that it has to be expanded onto the pipe when the pipe is inserted into the body member. The split gripper ring is cammed inwardly by the frustoconical surface upon outward movement of the pipe and when its ends abut, the minor exterior diameter of the split gripper ring is at least as great as the minor diameter of the frusto-conical surface so that further outward movement of the gripper ring is prevented.

In order to obtain uniform pullout characteristics for a joint of a particular size, the annular split gripper ring has its gripping means provided with a plurality or series of teeth extending from one end to the other end thereof, the teeth being uniquely dimensioned and disposed. In this respect, because of manufacturing tolerances, it has been found in the past that the gripper rings could not be made accurate enough to have all of its teeth simultaneously bite into the pipe upon initial contact. If only the teeth intermediate the teeth adjacent to the ends of the gripper ring engage the pipe upon initial contact, the gripper ring will not hold the pipe upon an outward pull on the same as there is a slight rocking of the gripper ring causing the same to slip relative to the pipe and, thus, the gripper ring will not cam inwardly about the pipe. On the other hand, if there is full contact of all teeth or if the teeth at or adjacent each of the ends contacts the pipe initially, then when an outward load is placed on the pipe, higher gripping forces result because more and more teeth contact the pipe as the load is increased. In the present invention the teeth are dimensioned and disposed so that the teeth at or adjacent the ends of the gripper ring always initially bite into the pipe upon stabbing of the pipe into the joint. Additionally, the sharpness of the teeth is controlled within the range of .002 inches to .008 inches in order to be sharp enough to grip the plastic pipe.

While the joint of the present invention is primarily intended for non-metallic plastic pipe, it may also be used with smooth wall or flareless metal pipe. In each instance, the split gripper ring or at least its gripping means must be made of a material sufficiently hard so that it can firmly grip the end of the pipe. This results in the joint, when made up, having high pull out strength. Ancillary to this feature of the invention, the inlet end of the end portion of the passageway is beveled as is the inlet end of the split gripper ring to reduce the possibility of scratching the pipe in a longitudinal direction thereof upon insertion into the body member. The end of the pipe is also beveled so that it functions with the bevel on the body member and the bevel on the split gripper to assist the workmen during make-up to properly guide the end of the pipe into the body member.

The annular elastomeric sealing ring member which is preferably an O-ring and which functions separate from the gripper ring cooperates with the cylindrical surface of the second bore and the cylindrical surface of the pipe during make-up and in normal use so that a seal is immediately made which can seal at zero pressure up to the intended pressures of use. It is necessary to provide a seal at zero pressure so that there can be no ingress of fluid from the exterior of the joint. An additional object of providing the O-ring in an area of the joint between two cylindrical surfaces is to minimize set of the O-ring during continued use and this is important, where after long use, there is some inward shifting of the pipe. If there is permanent set in the O-ring and the O-ring is acting only on wedging surfaces, movement of the pipe inwardly will completely release the wedging action.

The inner end of the split gripper ring is beveled on its exterior to provide a space for slight flow of the sealing ring at high pressures. When larger outside diameter pipe is used, the gripper ring, during makeup of the joint, moves outwardly only to a position where its inner end maintains the sealing ring in a position where it is still cooperating with the concentric cylindrical surfaces of the pipe and the second bore. Some plastic pipe is made with controlled inside diameter (I.D.) and the outside diameter (O.D.) may vary depending on the (1) type of plastic, (2) the pressure rating, and (3) manufacturing capability. Where the diameter is slightly reduced, the split gripper ring will move further axially outwardly during make-up and in such situations where there is extreme high pressure of fluid within the joint, the O-ring does move axially outwardly to a position where it coacts with the frusto-conical surface of the end portion of the passageway. In this latter situation, when there is a subsequent axial inward movement of the O-ring, the O-ring will seal against the cylindrical surface of the second bore because its initial dimensions were such that the O-ring was under a load as soon as make-up of the joint was completed.

The present invention provides an improved joint for both non-metallic plastic pipe and metallic pipe which is simple and inexpensive to manufacture, and which may be easily and quickly made up in the field for use in fluid lines for distribution of fluids such as gas, water and certain flowable chemical products. The joint is capable of make-up in the field by workmen without any requirement for unusual or special technical knowledge.

The foregoing advantages of the invention will appear more fully from the following specification, claims and drawings.

DETAILED DESCRIPTION OF THE INVENTION

Figure 1:
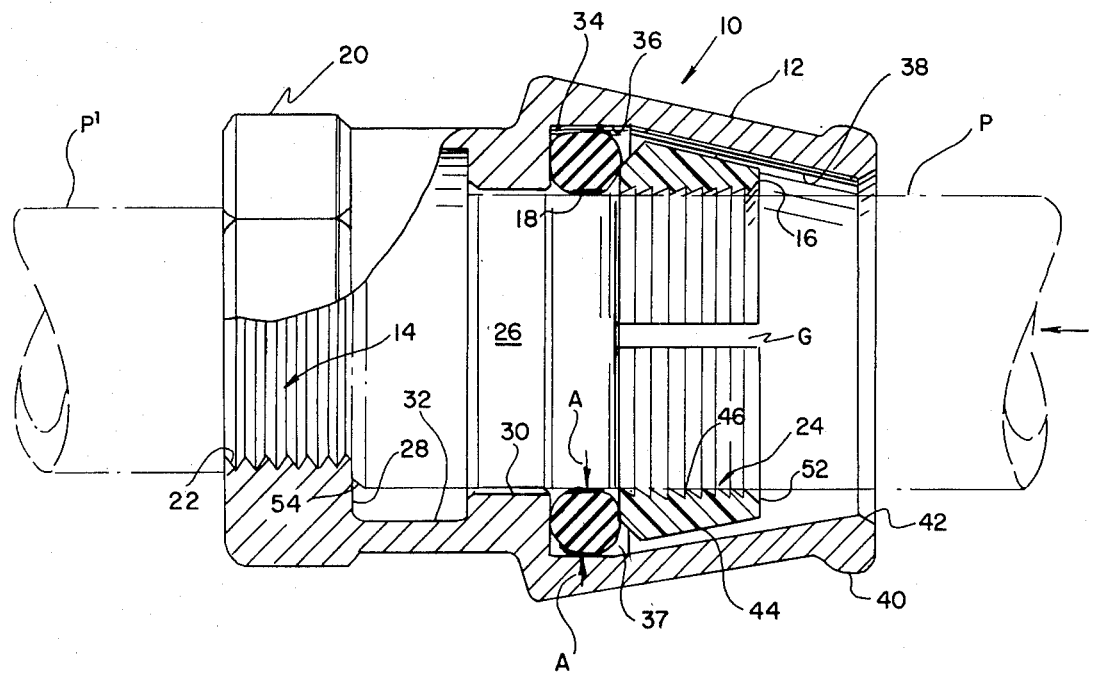
FIG. 1 is a longitudinally extending vertical sectional view, partly in elevation, through a joint of the present invention, the view illustrating the initial insertion of the pipe to a position abutting the annular shoulder or stop.

Referring now to the drawings wherein like character or reference numerals represent like or similar parts, there is disclosed in FIGS. 1–5 inclusive a joint of the present invention, generally designated at 10. The joint 10 is used for attaching smooth wall or flareless pipe P to a fitting or another pipe.

Broadly, the joint 10 includes a hollow body member 12 having a passageway 14 therethrough, an annular split gripper ring 16 positioned within the passageway for gripping the end portion of the pipe P, and an annular elastomeric sealing ring member 18 also positioned within the passageway but between the split gripper ring and an annular shoulder to be described later in the specification. As shown in the drawings, the hollow body member 12 is provided with a hexagonal end portion at one end thereof, as indicated at 20 and the through passageway 14 in the area or zone of the hexagonal end portion 20 is interiorly threaded as indicated at 22 for receiving the exteriorly threaded end of a pipe P′. It will be understood the joint 10 as illustrated is for connecting the smooth wall pipe P to another pipe P′ which is exteriorly threaded. Of course, the pipe P′ could be interiorly threaded and if this is the situation, then the end portion 20 would be exteriorly threaded rather than hexagonal in shape. The end portion 20 of the body member 12 as illustrated, is merely representative of one form of the body member for the purpose of the present description. Those skilled in the art will understand the end portion 20 could be a fitting such as a valve body or valve stop or a fitting acceptable for connection to a tank or the like. Additionally, the end portion 20 could be identical to the joint 10 to be described so that the joint in effect couples two smooth wall or flareless pipes to each other.

The joint 10 is primarily for use in providing a connection for non-metallic plastic pipe made either of a hard or soft plastic material which is not readily acceptable to being flared or to having a pipe thread cut thereon or the joint could be used with metal pipe such as copper with or without circumferential grooves or the like provided on the outer surface of the same. Typical plastic material used today for pipes of water, gas or chemical distribution systems are polyethylene (PE),; polyvinyl chloride (PVC,); polybutylene (PB); and the like. Depending upon the type of material of the pipe P, the annular split gripper ring 16 or at least its gripper means 24 on its interior surface must be of a material sufficient to grip the pipe. Usually the material is as hard or harder than the pipe but there may be situations where a softer material may be used. For example, if the pipe P is made of polyethylene, then the split gripper ring 16 or its gripper means 24 may be "Celcon" and if the pipe P is copper, then the split gripper ring or its gripper means may be steel.

As mentioned before, the hollow body member 12 is provided with the passageway 14 therethrough. The passageway 14 is provided with an axially extending end portion 26 for receiving the end portion of the pipe P, the portion 26 in the embodiment shown extending from the inner end of the interior threads 22 outwardly to the end of the body member 12. In more detail, the axially extending end portion 26 is defined by a first transversely extending annular shoulder 28 facing outwardly, the shoulder 28 having an interior diameter less than the outside diameter of the pipe P so that it provides a stop for the pipe P when the pipe P is inserted into the body member 12. A first cylindrical counter bore 30, coaxial of the shoulder or stop 28 and having a diameter substantially equal to the pipe P, has at least its outer end spaced axially outwardly from the first shoulder 28, the purpose of the cylindrical bore 30 being to provide support for the end of the pipe inwardly of the sealing ring 18 when the joint 10 is made up. The body member 12 is made from cast brass which is quite expensive and consequently a coaxial counter bore 32 is provided between the first shoulder 28 and the inner end of the cylindrical bore 30 to reduce the amount of brass in the body member. This counter bore may be made by coring out when the body member is cast. The cylindrical bore 30 terminates at its outer end with a second transversely extending and outwardly facing coaxial annular shoulder 34. A second coaxial cylindrical bore 36 of greater diameter than the first bore 30 extends outwardly therefrom. A converging frusto-conical coaxial surface 38 extends from the outer end of the second bore 36 and terminates adjacent the outer end of the end portion 26 of the passageway 14. The frusto-conical surface 38, for example, has a taper of 9° with respect to the longitudinal axis of the end portion 26 of the passageway 14 with a minor diameter at its outer end at least large enough to receive the pipe P and a major diameter equal to the diameter of the second bore 36. The end of the body member 12 surrounding the minor diameter of the converging frusto-conical surface 38 is provided with a strengthening bead 40 whereas an inwardly converging bevel 42 surrounds the minor diameter of the surface 38.

The annular sealing ring member 18 is positioned within the end portion 26 of the passageway 14 in the area of the cylindrical bore 36. This ring member is preferably an O-ring which is made from an elastomeric material suitable for use with the particular fluid of the distribution system and in its relaxed position, it has an inside diameter less than the outside diameter of the pipe P so that it has to be stretched when the pipe is inserted therethrough. The radial thickness of the ring member 18 is such that when it is stretched onto the pipe P, it will have an immediate positive interference fit with the wall of the bore 36. In other words, the squeeze, as indicated by the arrows A in FIG. 1, is such that the O-ring assumes an oval shape in cross section and thus provides a seal at zero pressure as the joint is initially made up and should the joint be subsequently subjected to zero pressure this prevents ingress of fluids from externally of the joint 10. At this point in the specification it should be noted that when the pipe P has been inserted into the body member 12, the outer cylindrical surface of the pipe, together with the cylindrical bore 36 define an annular cylindrical sealing chamber 37 of an axial extent sufficient to permit some axial movement of the O-ring member 18 during make-up of the joint. Under normal pressure of use, the primary seal of the O-ring is between the outer surface of the pipe P and the bore 36 because of the squeezing action and immediate positive interference of the O-ring member 18.

Figure 6:
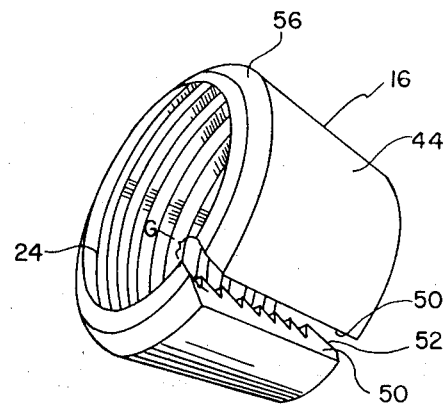
FIG. 6 is a perspective view of the annular split gripper member.
Figure 5:
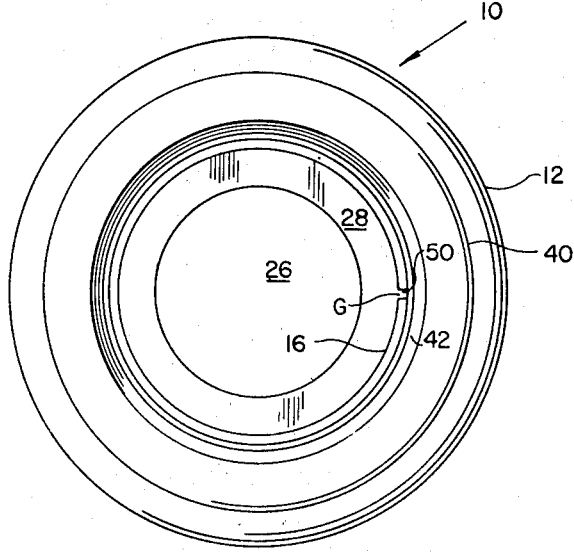
FIG. 5 is an end elevational view of the joint of FIGS. 1–4 inclusive looking from the right of the figures to the left of the same.

As previously mentioned, the annular split gripper ring 16, or at least its gripper means 24 on the interior surface thereof, must be made of a material sufficiently hard to grip the pipe and in this respect, the split gripper ring 16 may be considered as being rigid in the sense that it is not deformable or flowable at intended pressures of use and it maintains its shape to provide for high pullout strength of the made up joint. However, the annular split gripper ring 16 is flexible and spring-like to the extent that it can be expanded onto the pipe and then contracts sufficient to grip the pipe during make-up of the joint 10. It must also be flexible enough to be twisted to an extent where it can be inserted into the passageway 14. Referring to FIG. 6, as well as to the figures illustrating the split gripper ring 16 in cross-section, it will be noted that the outer circumferential surface 44 of the gripper ring is frusto-conical and is generally complementary in shape to the frusto-conical surface 38 of the end portion 26 of passageway 14. This frusto-conical surface 44 of the split gripper ring 16 has a taper, for example, of 9° to the axis of the ring but it could vary a couple of degrees with respect to the taper of the frusto-conical surface 38 and still function as described. It will be noted the axial extent of the annular split gripper ring 16 is less than the axial extent of the frusto-conical surface 38 and as will be explained later in the specification, the split gripper ring moves axially with respect to such surface when the pipe P is moved to the right after insertion and, thus, the surface 38 ultimately functions as a camming or wedging surface for contracting the gripper ring 16 tightly about the pipe P to prevent removal of the pipe from the body member 12.

The gripper means 24 on the interior bore of the gripper ring includes a plurality of axially spaced teeth 46 provided integrally with the body of ring or as an insert in the body, the teeth being in effect annular grooves of sawtooth configuration in radial section. The teeth 46 each have a surface 48 facing the large end of the split gripper ring 16 and, thus, facing inwardly when the ring is within the passageway, that extends in a substantially radial plane or a plane normal to the axis of the ring. As will be understood, this arrangement prevents pullout of the pipe P once the pipe is inserted through the gripper ring. If desired, the smooth end of the pipe may be provided on its exterior with circumferential grooves (not shown) of sawtooth configuration for co-operating with the teeth 46.

Figure 8:
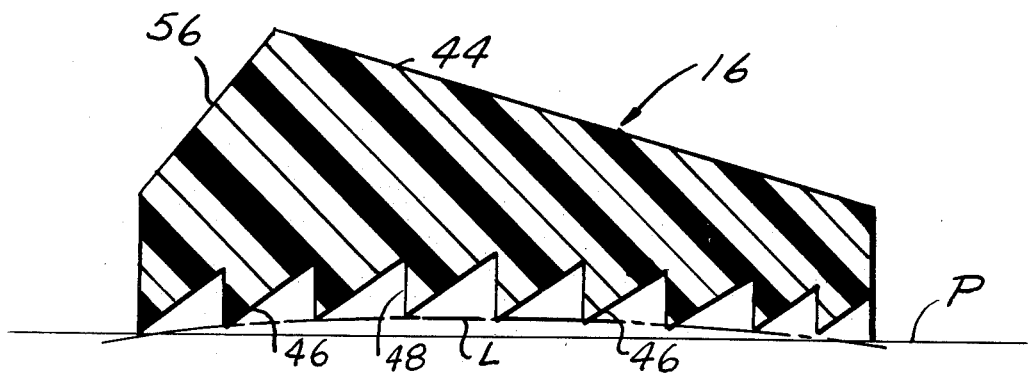
FIG. 8 is an enlarged longitudinal sectional view through the gripper ring of the present invention and illustrating a satisfactory disposition of teeth wherein the teeth at or adjacent the axial extremities make initial contact upon stabbing of the pipe.

Referring now to FIG. 8 and to ensure uniformity of pullout performance of joints, the gripper ring 16 is shown with its teeth 46 disposed so that a line L through the tips of the teeth is somewhat concave. In this arrangement it will be noted that the teeth at or adjacent to the axial extremities of the gripper ring 16 have initial contact or bite with the pipe P when the pipe P has been stabbed into the joint 10 as shown in FIG. 1.

Figure 4:
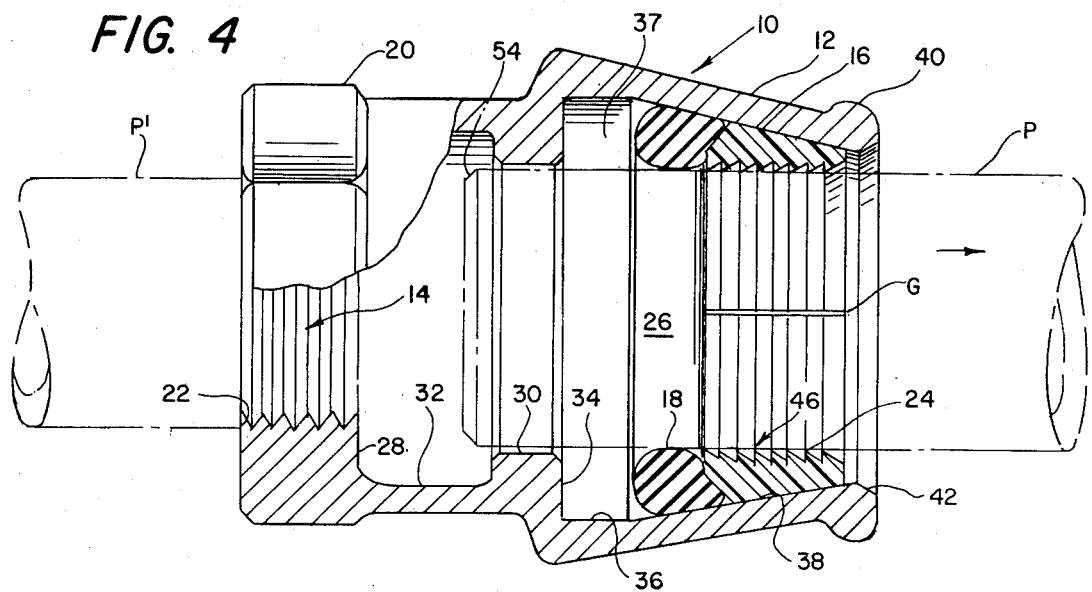
FIG. 4 is a longitudinal vertical sectional view, partly in elevation, of the joint of the present invention but utilizing a pipe of slightly smaller diameter and illustrating the position of the sealing ring member when the joint is placed under extremely high pressure.
Figure 3:
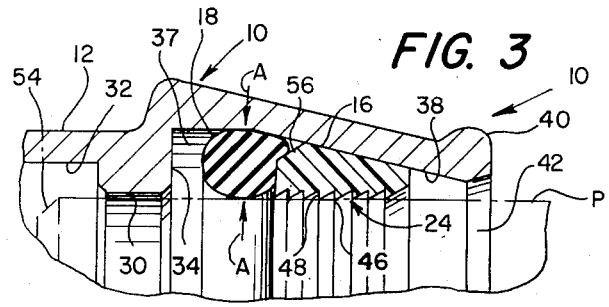
FIG. 3 is a fragmentary sectional view similar to FIG. 2 but illustrating the joint when under high pressure and showing movement of the sealing ring member downstream.
Figure 9:
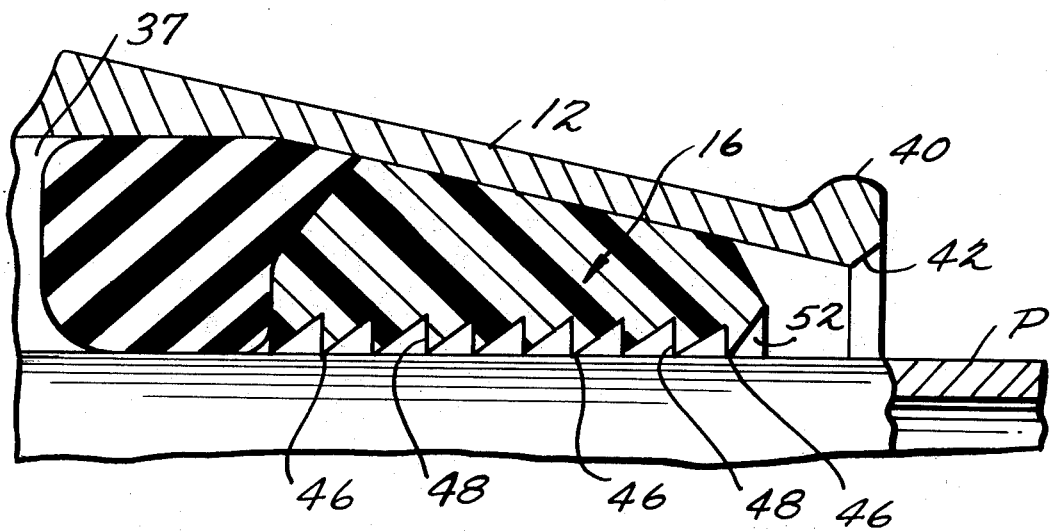
FIG. 9 is a fragmentary longitudinal sectional view illustrating a gripper ring of FIG. 8 on a slightly reduced scale, on a pipe, the pipe having a load thereon and the ring being cammed inwardly so that in addition to the teeth at or adjacent to the end making contact, all of the intermediate teeth have made contact and grip the pipe.

Referring now to FIG. 9, it will be noted there has been a pull to the right on the pipe P and the pipe P has carried the gripper ring 16 to the right where it is cammed inwardly to contract about the pipe P as in FIG. 3 or 4. All of the teeth 46 now engage the exterior wall of the pipe, thus, increasing the gripping capability of the joint. Additionally, each tooth 46, to ensure being sharp enough to grip the plastic pipe has a radius at its tip in the range of 0.002 inches to 0.008 inches.

Figure 7:
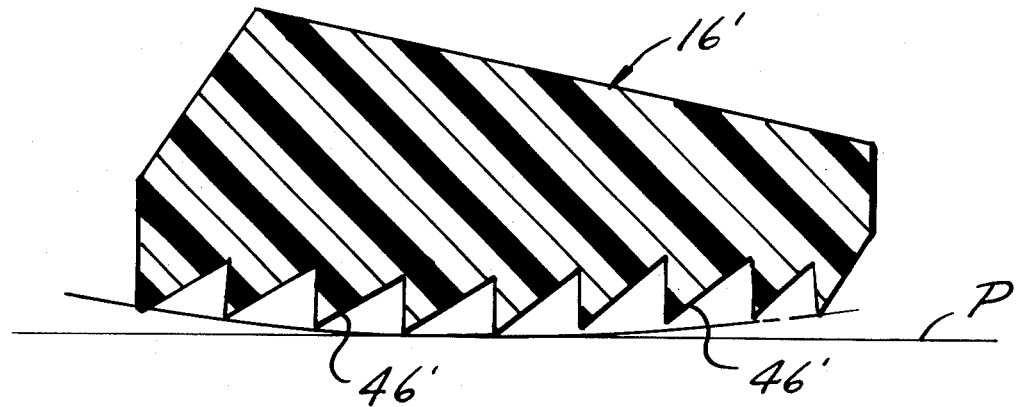
FIG. 7 is an enlarged longitudinal sectional view through a fragment of a gripper ring and illustrating an unsatisfactory arrangement of teeth wherein the teeth are disposed in a slight convex manner.

In FIG. 7, there is illustrated a gripper ring 16' substantially identical with the gripper ring 16 of FIG. 8 with the exception that a line drawn through the tips of the teeth 46' is generally convex and, consequently, only the intermediate teeth engage the pipe P upon initial stabbing of the pipe. This arrangement has proven unsatisfactory because when the joint is made up and a load is placed on the pipe P there is a rocking of the gripper ring 16' and, thus, it never really grips the pipe but slips and thus the joint has a low pullout capability. The present invention avoids this undesirable characteristic by specifically dimensioning and disposing the teeth so that the gripper ring always has at least the teeth at or adjacent to its ends making initial engagement upon initial stabbing of the joint.

The joint 10 of the present invention has the advantage of the pipe being rotatable after assembly and prior to actuation of the gripper ring 16 as a seal is immediately made. This results in (a) ease in make up of a second joint on the opposite end of the pipe, (b) straightening out of "coiled" pipe in a ditch and/or (c) positioning a valve, meter set or the like.

The split gripper ring 16, in its relaxed condition, has its opposed ends 50 spaced by a gap G such that the interior diameter of the gripper ring is less than the outside diameter of the pipe P and, thus, when the pipe P is thrust enough the gripper ring during make-up, the gripper ring will have to be expanded slightly and its inherent spring-like characteristic will provide an initial positive gripping interference between the split gripper ring 16 and the pipe P so the gripper ring can move in only one direction with respect to the pipe. To assist in guiding the pipe P into the joint 10 and into the split gripper ring 16, the body member 12, as previously mentioned, is provided with the inwardly converging annular bevel 42 and the gripper ring, at its outer end, is also provided with an inwardly converging bevel 52. Additionally, the end of the pipe P is beveled as indicated at 54 to further assist in properly guiding the pipe into the body member 10 and the gripper ring 16 as well as through the O-ring 18. The bevels prevent longitudinal scratching of the pipe P which could possibly weaken the same, especially when the pipe is made of a non-metallic plastic material.

An annular exterior bevel 56 is provided on the larger end of the split gripper ring 16 and this bevel provides a space for the flow of the O-ring member 18 when the gripper ring is in the made-up position of the joint 10, the space only being used when the joint is under high pressures.

As the split gripper ring 16 moves toward the right of FIGS. 1-4, it will contract and the gap G will decrease. When the opposed ends 50 of the annular split gripper ring 16 abut one another, the minor diameter of the gripper ring is no less than the minor diameter of the frusto-conical surface 38 of the end portion 26 of passageway 14. Such an arrangement provides two functions for the joint 10. First, it prevents the gripper ring from moving axially outwardly of the end portion 26 of passageway 14 and secondly, it limits the interior diameter of the gripper ring to a diameter which is not sufficient to crush or materially deform the pipe P. By such an arrangement, it is not necessary to insert a rigid sleeve member within the pipe to make a satisfactory joint although such a sleeve member can be inserted if desired.

The make-up of the joint 10 will now be described. Referring first to FIG. 1, the hollow body member 12, with the annular sealing ring member 18 and the annular split gripper ring 16 positioned in the end portion 26 of passageway 14, may be first threaded onto the pipe P'. The pipe P, which is the smooth end or flareless pipe and which may be a service line to a dwelling or building, may then be stabbed or thrust to the left of FIG. 1. The split gripper ring 16, which is of less interior diameter than the outer diameter of the pipe, will first be moved by the end 54 of the pipe P toward the left and it will carry with it the sealing ring member 18 until the ring member abuts the transverse or radially extending annular shoulder 34. Since the split gripper ring 16 cannot move further to the left than the aforementioned position, the beveled end 54 of the pipe will cam and expand the gripper ring as the pipe P is thrust further into the body member 12. The inward thrust of the pipe P continues and eventually it passes through the O-ring member 18 stretching the O-ring member radially outwardly and as explained before, the O-ring member will then have an immediate interference fit in the annular cylindrical sealing chamber 37. Pipe P is further thrust to the left of FIG. 1 until its end 54 abuts the first transversely or radially extending annular shoulder or stop 28 and during this latter motion of the pipe, both the split ring 16 and the O-ring member 18 maintain a relatively stationary position with respect to the body member 12 as shown. It will be noted that in final position of the pipe to the left as shown in FIG. 1, the frusto-conical surface 44 of the split gripper ring 16 does not engage the frusto-conical surface 38 of the body member 12 but the O-ring member 18 has provided a seal so that the joint 10 is capable of immediate use from zero p.s.i. pressure up to and above pressures of intended use.

Figure 2:
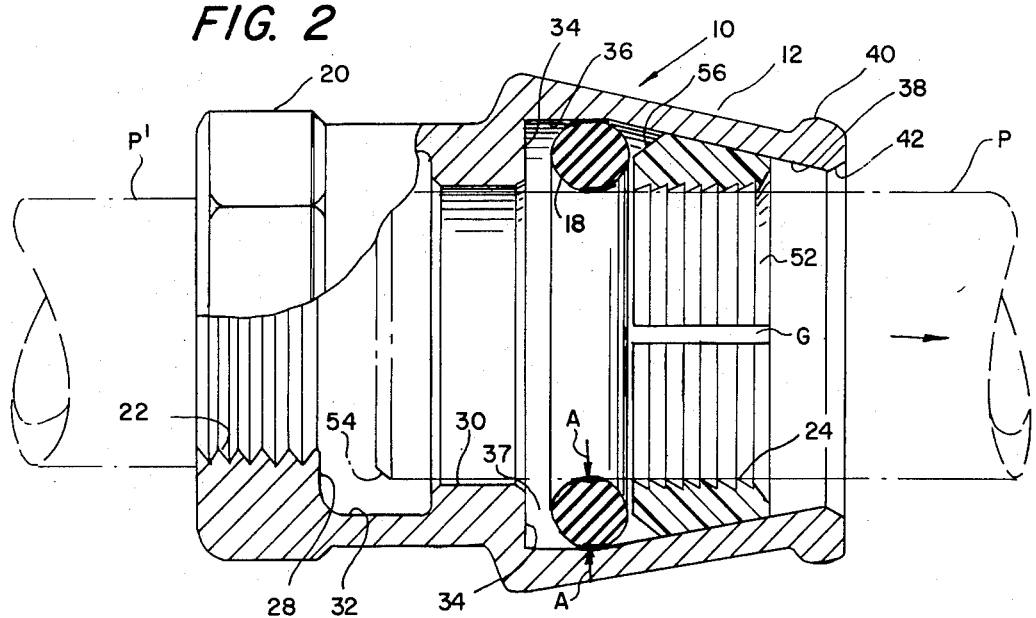
FIG. 2 is a longitudinal vertical sectional view of the joint similar to FIG. 1 but illustrating the joint after completion of make-up and prior to application of high pressure to the interior of the same.

Once the parts of the joint 10 have assumed the position shown in the FIG. 1, then the workman may pull the pipe P in a reverse direction or to the right as shown in FIG. 2 or this may occur if a load is subsequently placed on the pipe. Since there is a positive interference fit between the pipe P and the split gripper ring 16 so that it cannot be moved to the left relative to the pipe, it will be carried with the pipe P and its frusto-conical surface will engage the frusto-conical camming surface 38 of the body member 12 and then the split gripper ring will be further contracted with the teeth 46 functioning to prevent relative movement between the pipe P and the split ring. During this stage of the make-up of the joint 10, the O-ring member 18, because it has an interference fit in the chamber 37 as soon as it is expanded onto the pipe P, will move to the right of the chamber as the pipe is moved to the right. It will assume the position shown in FIG. 2 with the point of squeeze through the radial center of the O-ring being between the two cylindrical or plane surfaces of the annular sealing chamber 37. The joint is then ready for use and will seal against ingress or egress of fluid at zero p.s.i.

For normal operating pressures of fluid, the O-ring member 18 will satisfactorily seal in the position shown in FIG. 2. Should there be a further movement of the gripper ring to the right by a pullout load exerted on the pipe P, it will not affect the sealing characteristics of the O-ring member 18 as the two elements 16 and 18, in this situation are functioning independently. If for some reason there is a reverse movement of the pipe P inwardly, this will not affect the sealing of the O-ring member 18 because, as explained above, it is acting between two annular cylindrical surfaces and any rolling of the O-ring will not decrease the squeeze but would rather increase the squeeze if there is a slight permanent set.

Referring now to FIG. 3, the joint 10 is shown in a situation where there is extremely high pressure fluid flowing through the pipes P and P'. The O-ring member 18 will flow slightly into the space provided by the annular bevel 56 on the gripper ring 16 but the squeeze A is still within the axial extent of the annular chamber 37. Should the pipe P be moved slightly towards the right of FIG. 3, it will carry with it the split gripper ring 16 as well as the O-ring member 18 but since the O-ring member is being squeezed through its center between two concentric cylindrical surfaces of the chamber 37, it still will maintain the seal both at zero pressure and the high pressure.

FIG. 4 represents utilizing a pipe P of slightly smaller outside diameter but the same inside diameter as the pipe P in FIG. 3. Additionally, this Figure represents the joint 10 when there is an extreme over pressure produced in the pipes P and P' and the pipe P has been moved as far to the left as possible either during make up or by a subsequent load thereon. Since the outer diameter of the pipe P in FIG. 4 is smaller than that shown in FIG. 3, the split gripper ring 16 will move more to the right than the gripper ring did in FIG. 3 and the gap G will be substantially closed. Under normal operating pressures, the O-ring member 18 will not be in the position shown in FIG. 4 but will be positioned slightly to the left where it is operating between the annular cylindrical concentric surfaces of the chamber 37. Under unusual high pressures there is the possibility for the O-ring to be moved downwardly on the frusto-conical surface 38 to a position where it assumes the shape shown. If the pipe P is moved to the left while the high pressure remains within the joint 10, no problems result because the pressure conforms the O-ring member 18 into sealing engagement with the pipe and the surface 38. Even in the circumstance where the pressure within the joint is reduced to zero, there still will not be a leak because of the tendency of the O-ring member 18 to roll and because there was an initial interference fit between the concentric surfaces of the annular chamber 37 and the O-ring member 18.

In FIGS. 2, 3 and 4, it will be noted that the cylindrical bore 30 which defines an annular rib supports the end portion of the pipe P adjacent the extremity of the same. This is important in situations where a lateral load is placed on the pipe P by, for example, a shift in the ground caused by freezing and thawing, as it prevents the gripper ring 16 from acting as a fulcrum point for the pipe, thus, causing unequal radial squeeze on the O-ring member 18.

The terminology used throughout this specification is for the purpose of description and not limitation, the scope and spirit of the invention being defined in the following claims.

What is claimed is:

1. An improvement in a joint for connecting an end portion of a smooth wall pipe to fittings or other pipes comprising:

a hollow body member having a passageway therethrough with an axially extending end portion for receiving the end portion of said pipe, said axially extending end portion of said passageway being defined by a first transversely extending annular shoulder at its inner end and facing outwardly, said first shoulder having an interior diameter less than the outside diameter of the pipe and arranged for initial abutting by the end of the pipe, a first cylindrical bore having a diameter substantially equal to the diameter of the pipe, said first cylindrical bore having its outer end spaced axially outwardly from said first shoulder and terminating in a second transversely extending downwardly facing shoulder, a second cylindrical bore of greater diameter than said first bore and extending outwardly from said second shoulder, and a converging frusto-conical surface extending from the outer end of said second bore and terminating adjacent the outer end of said end portion of said passageway, said frusto-conical surface having a minor diameter at its outer end large enough to receive the end portion of said pipe;

a spring-like flexible annular split gripper ring having an axial extent less than the axial extent of said frusto-conical surface, said ring having a frusto-conical exterior surface tapering in the same direction as the frusto-conical surface of said passageway and a cylindrical interior surface provided with pipe gripping means thereon, said gripping means including a plurality of axially spaced teeth extending substantially the entire axial extent of said gripping ring, the teeth at and adjacent to each axial extremity of the gripping means having a diameter slightly less than the diameter of teeth intermediate the same so as to provide an initial bite into the pipe when the pipe is initially inserted into the gripping means with the intermediate teeth being slightly spaced from the pipe, and each of said teeth having an inwardly facing surface extending in a plane substantially normal to the axis of the gripper ring, said ring being positioned within said end portion of said passageway of said body member in an area of said frusto-conical surface of said passageway with its larger end inwardly and when relaxed having an interior diameter less than the outside diameter of the pipe;

and an annular elastomeric sealing ring member positioned within said end portion of said passageway between said second shoulder and said inner end of said split ring in an area of said second cylindrical bore, said sealing ring member when relaxed having an inner diameter less than the outer diameter of said pipe and a radial thickness sufficient to cause the sealing ring member to seal against said second cylindrical bore when stretched onto said pipe.

2. A joint as claimed in claim 1 in which each of said teeth have a tip radius in a range of 0.002 inches to 0.008 inches.

3. A joint as claimed in claim 2 in which a line through the tips of said teeth from one end of said gripping means to the other is slightly concave.

4. A joint as claimed in claim 1 in which said flexible annular split ring has ends which abut when said ring is cammed by said frusto-conical surface of the end portion of said passageway, and when said ends are abutting, said split ring has a minor exterior diameter at least as great as the minor diameter of the frusto-conical surface of said end portion of said passageway to thereby prevent the ring from collapsing the pipe or to prevent the ring from passing outwardly of the body member.

5. A joint as claimed in claim 1 in which said gripper ring is provided with an annular exterior bevel on its larger inner end to define a space for flow of said elastomeric ring member at high pressures.

6. A joint as claimed in claim 1 in which said gripper ring is provided with an interiorly extending bevel at its outer end and, in which said pipe is provided with an exterior bevel on its end for cooperating with the interior bevel when inserting said pipe into the end portion of said passageway to thereby properly align the gripper means and pipe.

7. A joint as claimed in claim 6 wherein said hollow body member is provided with a bevel about the outer end of the end portion of said passageway to assist in guiding said pipe into said fitting.

8. A joint as claimed in claim 1 in which said pipe is made from a plastic material.

9. A joint as claimed in claim 8 in which said plastic material is polyethylene and in which said gripper ring is made from Celcon.

10. A joint as claimed in claim 1 in which said sealing ring member is an O-ring.

11. A joint as claimed in claim 10 in which said second cylindrical bore has an axial extent greater than the radial thickness of said O-ring whereby said O-ring may have axial movement of the joint within the area of said second cylindrical bore at normal pressures of intended use.

12. A joint as claimed in claim 1 in which said body member is provided with a counter bore intermediate said first shoulder and said first cylindrical bore.

13. A joint as claimed in claim 1 in which said frusto-conical surface of said body member and said frusto-conical surface of said gripper ring are complementary to each other and each has an angle to the axis of the joint in the order of 9°.

14. A joint as claimed in claim 1 in which at least said gripping means of said gripper ring is made of a material at least as hard as material of the pipe.

15. An improvement in a joint for connecting an end portion of a smooth wall pipe to fittings or other pipes comprising:

a hollow body member having a passageway therethrough with an axially extending portion for receiving the end portion of the pipe, said axially extending end portion of said passageway being defined by at least a first bore providing a chamber between the same and the wall of the pipe, and a frusto-conical surface extending from the bore and terminating adjacent the other end of said end portion of said passageway, said frusto-conical surface having a minor diameter at its outer end large enough to receive the end portion of said pipe;

a spring-like flexible annular split gripper ring having an axial extent less than the axial extent of said frusto-conical surface, said ring having a frusto-conical exterior surface tapering in the same direction as the frusto-conical surface of said passageway and a cylindrical interior surface provided with pipe gripping means thereon, said gripping means including a plurality of axially spaced teeth extending substantially the entire axial extent of said gripper ring, the teeth at and adjacent to each axial extremity of the gripping means having a diameter slightly less than the diameter of teeth intermediate the same so as to provide an initial bite into the pipe when the pipe is initially inserted into the gripping means with the intermediate teeth being slightly spaced from the pipe, and each of said teeth having an inwardly facing surface extending in a plane substantially normal to the axis of the gripper ring, said ring being positioned within said end portion of said passageway of said body member in an area of said frusto-conical surface of said passageway with its larger end inwardly and when relaxed having an interior diameter less than the outside diameter of the pipe;

and an elastomeric sealing ring member positioned within said chamber and providing a seal between the exterior of said pipe and the interior of said passageway.

16. A joint as claimed in claim 15 in which each of said teeth have a type radius in a range of 0.002 inches to 0.008 inches.

17. An improvement in a joint for connecting an end portion of a smooth wall pipe to fittings or other pipes comprising:

a hollow body member having a passageway therethrough with an axially extending portion for receiving the end portion of the pipe, said axially extending end portion of said passageway being defined by at least a first bore providing a chamber between the defined by at least a first bore providing a chamber between the same and the wall of the pipe, and a frusto-conical surface extending from the bore and terminating adjacent the outer end of said end portion of said passageway, said frusto-conical surface having a minor diameter at its outer end large enough to receive the end portion of said pipe;

a spring-like flexible annular split gripper ring having an axial extent less than the axial extent of said frusto-conical surface and having an interior diameter when relaxed less than the outside diameter of the pipe, said ring being positioned in said passageway and having a frusto-conical exterior surface tapering in the same direction as the frusto-conical surface of said passageway, said ring also having a plurality of axially spaced teeth on its interior surface extending its entire axial extent, said teeth being dimensioned and disposed with teeth intermediate those teeth at and adjacent each axial end having a diameter slightly greater than the diameter of those teeth at and adjacent each axial end so that intermediate teeth are spaced from the pipe when the pipe is initially inserted into the gripper ring and those teeth at and adjacent each axial end initially bite into the pipe, and each of said teeth having an inwardly facing surface extending in a plane substantially normal to the axis of the gripper ring;

and an elastomeric sealing ring member positioned within said chamber and providing a seal between the exterior of said pipe and the interior of said passageway.

18. A joint as claimed in claim 15 in which a line through the pipe of said teeth from one end of said gripping means to the other is slightly concave.

19. A joint as claimed in claim 17 in which a line through the tips of said teeth from one end of said gripping means to the other is slightly concave.

* * * * *

UNITED STATES PATENT OFFICE
CERTIFICATE OF CORRECTION

Patent No. 3,815,940  Dated June 11, 1974

Inventor(s) Lawrence F. LUCKENBILL

It is certified that error appears in the above-identified patent and that said Letters Patent are hereby corrected as shown below:

Col. 2, line 33, delete "in" and insert --is--

Col. 2, line 45, delete "pipe"

Col. 8, line 30, delete "enough" and insert --through--

Col. 11, line 14, delete "downwardly" and insert --outwardly--

Col. 11, line 33, delete "ping" and insert --per--

Col. 13, line 32, delete the entire line

Col. 13, line 33, delete "ing a chamber"

Col. 14, line 31, delete "pipe" and insert --tips--

Signed and sealed this 12th day of November 1974.

(SEAL)
Attest:

McCOY M. GIBSON JR.
Attesting Officer

C. MARSHALL DANN
Commissioner of Patents